(12) United States Patent
Li et al.

(10) Patent No.: US 9,912,145 B2
(45) Date of Patent: Mar. 6, 2018

(54) BOOST CONVERTER WITH SHORT-CIRCUIT PROTECTION AND METHOD THEREOF

(71) Applicant: Chengdu Monolithic Power Systems Co., Ltd., Chengdu (CN)

(72) Inventors: Yike Li, Chengdu (CN); Wangrui Guo, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 513 days.

(21) Appl. No.: 14/594,000

(22) Filed: Jan. 9, 2015

(65) Prior Publication Data
US 2015/0200536 A1 Jul. 16, 2015

(30) Foreign Application Priority Data
Jan. 10, 2014 (CN) .......................... 2014 1 0011470

(51) Int. Cl.
*H02H 7/12* (2006.01)
*H02H 1/06* (2006.01)
*H02H 3/093* (2006.01)

(52) U.S. Cl.
CPC ............ *H02H 7/1213* (2013.01); *H02H 1/06* (2013.01); *H02H 3/093* (2013.01)

(58) Field of Classification Search
CPC ......... H02H 7/1213; H02H 3/093; H02H 1/06
See application file for complete search history.

(56) References Cited

U.S. PATENT DOCUMENTS

| | | | | |
|---|---|---|---|---|
| 5,073,695 A * | 12/1991 | Gilliland | .............. | B23K 9/1087 219/130.31 |
| 6,185,082 B1 * | 2/2001 | Yang | ....................... | H02M 1/32 323/285 |
| 6,301,135 B1 * | 10/2001 | Mammano | ........ | H02M 3/33523 363/132 |
| 2004/0155628 A1 * | 8/2004 | Liscio | .................. | A61B 5/0046 320/127 |
| 2008/0252230 A1 * | 10/2008 | Takenaka | ............... | H05B 41/32 315/241 S |
| 2012/0236612 A1 * | 9/2012 | Uno | ........................ | H02M 1/36 363/126 |

* cited by examiner

Primary Examiner — Zeev V Kitov
(74) Attorney, Agent, or Firm — Perkins Coie LLP (57) ABSTRACT

A short-circuit protection method for a boost converter is disclosed. In this method, a switch of a switching circuit of the boost converter is turned on and a control voltage with a gradually increasing magnitude is supplied to control a short-circuit protection switch coupled between an input voltage and the switching circuit when the boost converter starts up. Then, a current flowing through the switch is detected and compared with a predetermined value. The switch is turned off and a preset time period is initiated if the current is higher than the predetermined value. It is detected whether a short-circuit event occurs at an output terminal of the boost converter at the end of the preset time period. If the short-circuit event occurs, the short-circuit protection switch is then turned off.

20 Claims, 5 Drawing Sheets

BOOST CONVERTER WITH SHORT-CIRCUIT PROTECTION AND METHOD THEREOF

CROSS-REFERENCE TO RELATED APPLICATION(S)

This application claims the benefit of CN application 201410011470.8, filed on Jan. 10, 2014, and incorporated herein by reference.

TECHNICAL FIELD

The present invention relates generally to electronic circuits, and more particularly but not exclusively to boost converters with short-circuit protection and methods thereof.

BACKGROUND

In boost converters, short-circuit protection is required to prevent the components from being damaged when a short-circuit event occurs at the output terminal of the boost converter.

In a prior art short-circuit protection method, a short-circuit protection (SCP) switch is coupled between a switching circuit of the boost converter and an input voltage and is disconnected to protect the boost converter when the output short-circuit is detected.

An external SCP switch is often used in prior arts to save cost and to improve electrical performances of the boost converter. Since the threshold voltage of the external SCP is uncertain, in the design of an IC controller for a boost converter, a design margin of a voltage provided to a control terminal of the external SCP switch is often required so that the IC controller can turn on most kinds of external switches.

Figure 1:
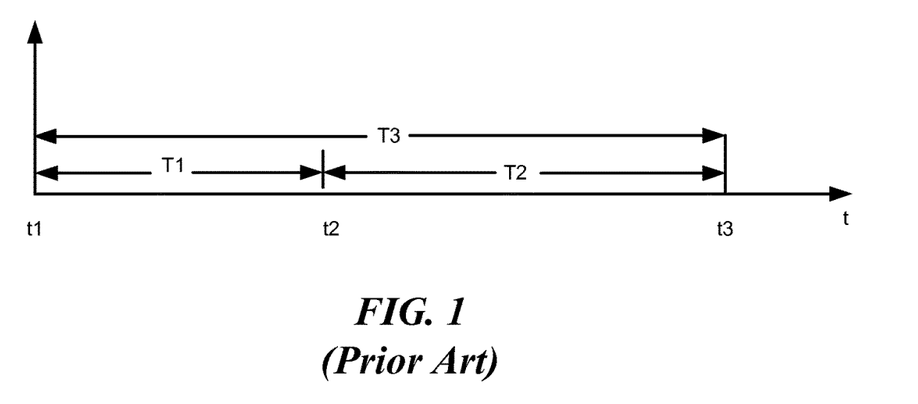
FIG. 1 illustrates a timing diagram showing the operation of the prior art short-circuit protection method.

In the above prior art short-circuit protection method, the output short-circuit is detected at the end of a predetermined fixed time period which begins from the moment when the boost converter starts up. However, the above method may be not accurate or prompt as the threshold voltage varies for different external SCP switches. FIG. 1 illustrates a timing diagram showing the operation of the prior art short-circuit protection method. In FIG. 1, t1 represents the moment when the boost converter starts up, t2 represents the moment when the external SCP switch is turned on, and t3 represents the moment when the short-circuit detection is performed, T1 represents the time period between the moments t1 and t2, T2 represents the time period between the moments t2 and t3, and T3 represents the time period between the moments t1 and t3. According to the description above, the time period T3 is predetermined and fixed and t2 is partly determined by the threshold voltage of the external SCP switch in the prior art method. Thus, if the threshold voltage of the external SCP switch is relatively large, the time period T1 will be relatively long and the time period T2 will be relatively short. As a result, an output capacitor of the switching circuit may not be fully charged at t3 and the short-circuit detection may be inaccurate. In opposite, if the threshold voltage of the external SCP switch is relatively small, the time period T1 will be relatively short and the time period T2 will be relatively long. As a result, the output short-circuit event may have occurred for a long time and the components in the switching circuit may have already been damaged. Thus, the short-circuit detection is not prompt.

SUMMARY

Embodiments of the present invention are directed to a short-circuit protection method for a boost converter comprising a short-circuit protection switch and a switching circuit. The short-circuit protection switch is coupled between an input voltage and the switching circuit. The switching circuit has a switch and is configured to provide an output voltage at an output terminal based on the input voltage. The short-circuit protection method comprises turning on the switch and supplying a control voltage to gradually turn on the short-circuit protection switch when the boost converter starts up; detecting whether a current flowing through the switch is higher than a predetermined value; turning off the switch and starting timing when the current flowing through the switch is higher than the predetermined value; detecting whether the output terminal of the boost converter is shorted to a reference ground after a preset time period; and turning off the short-circuit protection switch when the output terminal of the boost converter is shorted to the reference ground.

Embodiments of the present invention are also directed to a controller for a boost converter comprising a short-circuit protection switch and a switching circuit. The short-circuit protection switch has a first terminal configured to receive an input voltage, a second terminal and a control terminal. The switching circuit is coupled to the second terminal of the short-circuit protection switch and is configured to convert the input voltage into an output voltage, and the switching circuit comprises a switch. The controller comprises a short-circuit protection control circuit. The short-circuit protection control circuit comprises a current detecting circuit configured to detect whether a current flowing through the switch reaches a predetermined value and to generate a current detecting signal based on the detection; a timing circuit coupled to the current detecting circuit and configured to generate a timing signal based on the current detecting signal; a short-circuit detecting circuit coupled to the timing circuit and configured to generate a short-circuit detecting signal based on the timing signal; and a voltage generating circuit coupled to the current detecting circuit and the short-circuit detecting circuit and configured to generate a control voltage to control the short-circuit protection switch based on the current detecting signal and the short-circuit detecting signal. The controller also comprises a switching control circuit coupled to the current detecting circuit and the switching circuit and configured to generate a switching control signal to control the switch based on the current detecting signal and a feedback signal representative of the output voltage.

Embodiments of the present invention are further directed to a boost converter comprising a short-circuit protection switch having a first terminal, a second terminal and a control terminal, wherein the first terminal is configured to receive an input voltage; a switching circuit comprising an inductor, a switch, a freewheeling element and a capacitor, wherein the inductor has a first terminal coupled to the second terminal of the short-circuit protection switch and a second terminal, the switch has a first terminal coupled to the second terminal of the inductor, a second terminal coupled to a reference ground and a control terminal, the freewheeling element has a first terminal coupled to the second terminal of the inductor and a second terminal, and the capacitor has a first terminal coupled to the second terminal of the freewheeling element and a second terminal coupled to the reference ground, and wherein the capacitor is configured to provide an output voltage at the first terminal; a controller having a first terminal, a second terminal and a third terminal, wherein the first terminal is configured to receive a feedback signal representative of the output voltage, the second terminal is coupled to the control terminal of the short-circuit protection switch, and the third terminal is coupled to the control terminal of the switch; and wherein the switch is turned on and the short-circuit protection switch is gradually turned on when the boost converter starts up; and wherein the switch is turned off and a preset time period is initiated when a current flowing through the switch is higher than a predetermined value; and wherein whether an output short-circuit event occurs is detected after the preset time period; and further wherein the short-circuit protection switch is turned off when the boost converter is shorted to the reference ground.

BRIEF DESCRIPTION OF THE DRAWINGS

The present invention can be further understood with reference to the following detailed description and the appended drawings, wherein like elements are provided with like reference numerals.

DETAILED DESCRIPTION

The present invention is now described. While it is disclosed in its preferred form, the specific embodiments of the invention as disclosed herein and illustrated in the drawings are not to be considered in a limiting sense. Rather, these embodiments are provided so that this invention will be thorough and complete, and will fully convey the scope of the invention to those skilled in the art. Indeed, it should be readily apparent in view of the present description that the invention may be modified in numerous ways. Among other things, the present invention may be embodied as devices, methods, software, and so on. Accordingly, the present invention may take the form of an entirely hardware embodiment, an entirely software embodiment or an embodiment combining software and hardware aspects. The following detailed description is, therefore, not to be taken in a limiting sense.

Throughout the specification, the meaning of "a," "an," and "the" may also include plural references.

Figure 2:
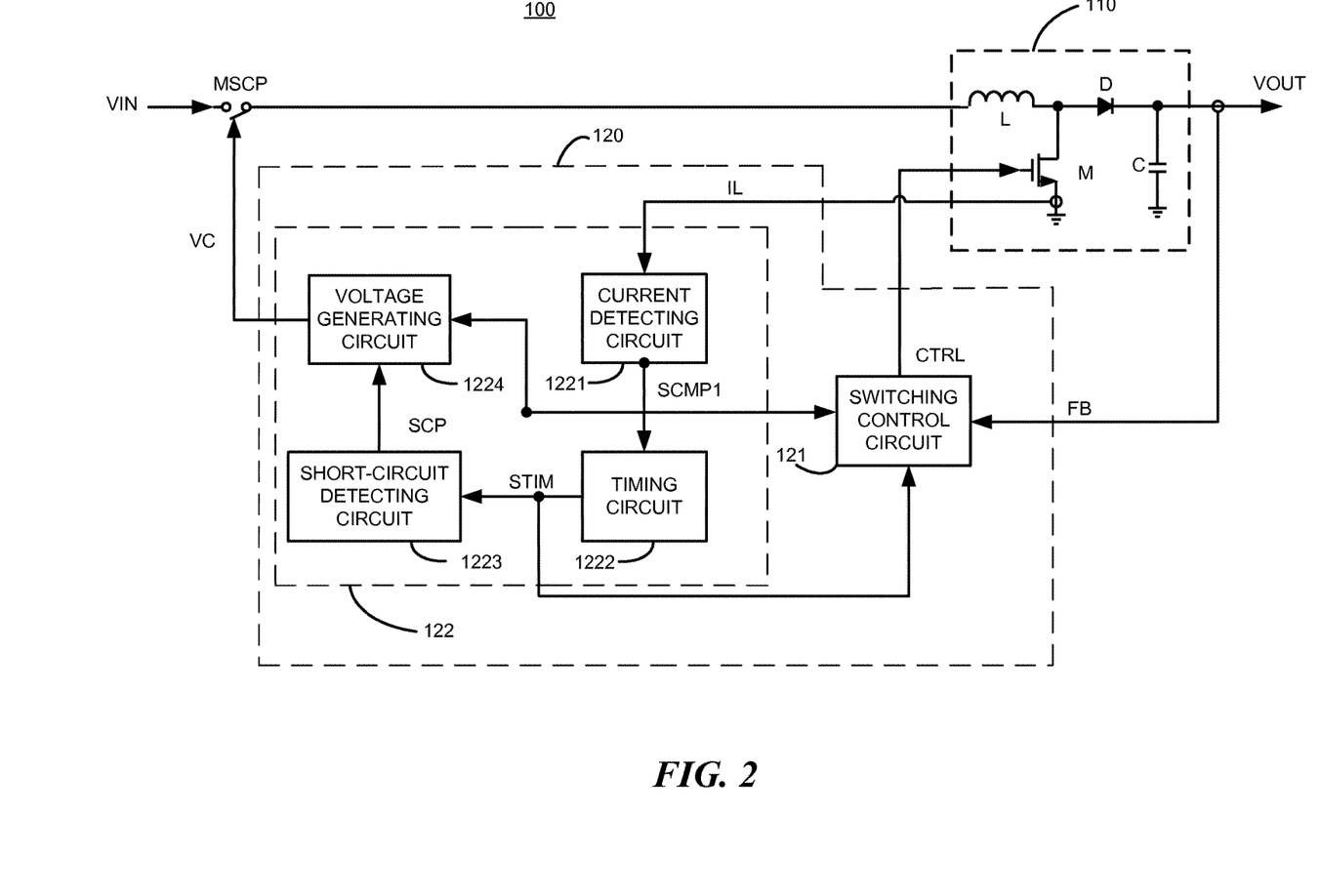
FIG. 2 illustrates a block diagram of a boost converter 100 in accordance with an embodiment of the present invention.

FIG. 2 illustrates a block diagram of a boost converter 100 in accordance with an embodiment of the present invention. As shown in FIG. 2, the boost converter 100 comprises a switching circuit 110, a controller 120 and a short-circuit protection switch MSCP.

The switching circuit 110 is implemented with an asynchronous boost converter topology. The switching circuit 110 comprises an inductor L, an output capacitor C, a switch M and a diode D. The inductor L has a first terminal and a second terminal. The diode D has an anode terminal and a cathode terminal, wherein the anode terminal is electrically coupled the second terminal of the inductor L. The output capacitor C has a first terminal and a second terminal, wherein the first terminal is electrically coupled to the cathode terminal of the diode D, and the second terminal is electrically coupled to a reference ground. The switch M has a first terminal, a second terminal and a control terminal, wherein the first terminal is electrically coupled to the second terminal of the inductor L, the second terminal is electrically coupled to the reference ground. The switching circuit 110 is configured to convert an input voltage VIN into a regulated output voltage VOUT by the switching actions of the switch M. The voltage across the output capacitor C is provided as the output voltage VOUT. In one embodiment, the diode D of the switching circuit 110 may be replaced by other freewheeling components, such as a transistor used for a synchronous boost converter topology. In another embodiment, the controller 120 and the switch M may be fabricated in a single IC chip and the diode D may be externally connected thereto. In further another embodiment, the switch of the switching circuit 110 may be implemented with any controllable switching semiconductor devices, such as MOSFET, IGBT or the like.

The controller 120 comprises a switching control circuit 121 and a short-circuit protection control circuit 122. The short-circuit protection switch MSCP and the short-circuit protection control circuit 122 forms a short-circuit protection circuit together. The short-circuit protection switch MSCP has a first terminal, a second terminal and a control terminal, wherein the first terminal is configured to receive the input voltage VIN, the second terminal is electrically coupled to the first terminal of the inductor L so that the input voltage VIN is supplied to the switching circuit 110 when the short-circuit protection switch MSCP is turned on. In one embodiment, the short-circuit protection switch MSCP may be implemented with any controllable switching semiconductor devices, such as MOSFET, IGBT or the like. In another embodiment, the short-circuit protection switch MSCP may be P-type or N-type transistors. In further another embodiment, the short-circuit protection switch MSCP may be fabricated in an IC chip inside which the controller 120 is fabricated or may be externally connected thereto.

The short-circuit protection control circuit 122 comprises a current detecting circuit 1221, a timing circuit 1222, a short-circuit detecting circuit 1223 and a voltage generating circuit 1224. The current detecting circuit 1221 is configured to detect if the current IL flowing through the switch M reaches a predetermined value ILref and to generate a current detecting signal SCMP1 based on the detection. The timing circuit 1222 is electrically coupled to the current detecting circuit 1221 to receive the current detecting signal SCMP1 and is configured to generate a timing signal STIM based thereupon. The short-circuit detecting circuit 1223 is electrically coupled to the timing circuit 1222 to receive the timing signal STIM. The short-circuit detecting circuit 1223 is configured to detect whether an output short-circuit event occurs in the boost converter 100 based on the timing signal STIM and to generate a short-circuit detecting signal SCP. The voltage generating circuit 1224 is electrically coupled to the current detecting circuit 1221 to receive the current detecting signal SCMP1. Based on the current detecting signal SCMP1, the voltage generating circuit 1224 regulates the magnitude of a control voltage VC supplied to the short-circuit protection switch MSCP. The voltage generating circuit 1224 is further electrically coupled to the short-circuit detecting circuit 1223 to receive the short-circuit detecting signal SCP. Based on the short-circuit detecting signal SCP, the voltage generating circuit 1224 regulates the control voltage VC so as to control the switching actions (on and off) of the short-circuit protection switch MSCP.

The switching control circuit 121 is electrically coupled to the switching circuit 110 and the current detecting circuit 1221 to respectively receive a feedback signal FB representative of the output voltage VOUT and the current detecting signal SCMP1. Based on the feedback signal FB and the current detecting signal SCMP1, the switching control circuit 121 is configured to generate a switching control signal CTRL to control the switching actions of the switch M. In one embodiment, the switching control circuit 121 may be implemented with PWM (pulse-width-modulation) technique, PFM (pulse-frequency-modulation) technique, or the like. In another embodiment, the switching control circuit 121 may employ current mode control, voltage mode control, or the like.

When the boost converter 100 starts up, the switching control signal CTRL is provided to turn on the switch M, and the control voltage VC with a gradually increasing magnitude is supplied to the short-circuit protection switch MSCP. When the boost converter 100 just starts up, the short-circuit protection switch MSCP is in off state as the magnitude of the control voltage VC is relatively small and no current substantially flows through the switch M. When the magnitude of the control voltage VC increases to the threshold voltage of the short-circuit protection switch MSCP, the short-circuit protection switch MSCP switches into on state and a current IL with a gradually increasing magnitude is flowing through the switch M. When the current IL increases to the predetermined value ILref, the voltage generating circuit 1224 maintains the magnitude of the control voltage VC and the switching control circuit 121 outputs the switching control signal CTRL based on the current detecting signal SCMP1 to turn off the switch M. Meanwhile, the timing circuit 1222 starts timing based on the current detecting signal SCMP1. When the timing circuit 1222 times out after a predetermined time period, the timing signal STIM enables the short-circuit detecting circuit 1223 and the short-circuit detecting circuit 1223 detects whether the output short-circuit event occurs in the boost converter 100. If yes, the voltage generating circuit 1224 will turn off the short-circuit protection switch MSCP based on the short-circuit detecting signal SCP. Otherwise, the voltage generating circuit 1224 will turn on the short-circuit protection switch MSCP based on the short-circuit detecting signal SCP, and the boost converter 100 will enter into normal operation.

Figure 3:
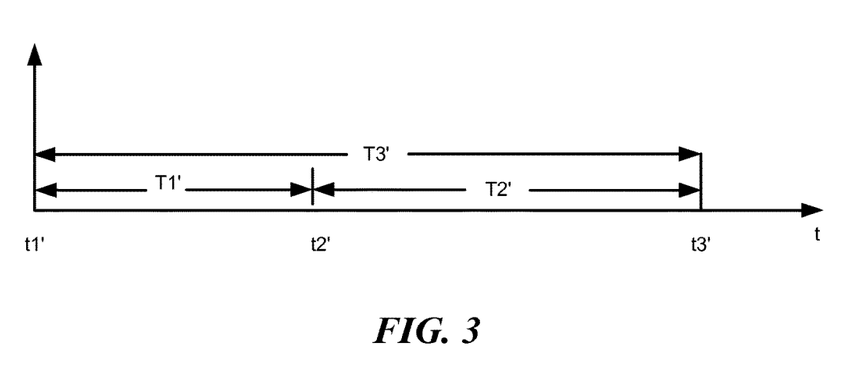
FIG. 3 illustrates a timing diagram showing the operation of the short-circuit protection circuit of FIG. 2.

FIG. 3 illustrates a timing diagram showing the operation of the short-circuit protection circuit of FIG. 2. As shown in FIG. 3, t1' represents the moment when the boost converter starts up, t2' represents the moment when the current IL increase to the predetermined value ILref, and t3' represents the moment when the short-circuit detection is performed, T1' is the time period between the moments t1' and t2', T2' is the time period between the moments t2' and t3', and T3' is the time period between the moments t1' and t3'. According to the description above, the time period T2' starts from the moment t2' and is a fixed value preset by the timing circuit 1222. Although the moment t2' varies with the threshold voltage of the short-circuit protection switch MSCP, the time period T2' does not vary with the threshold voltage of the short-circuit protection switch MSCP. Thus, the short-circuit protection circuit in accordance with the embodiment of FIG. 2 detects the output short-circuit of the boost converter 100 more accurate and prompt.

Figure 4:
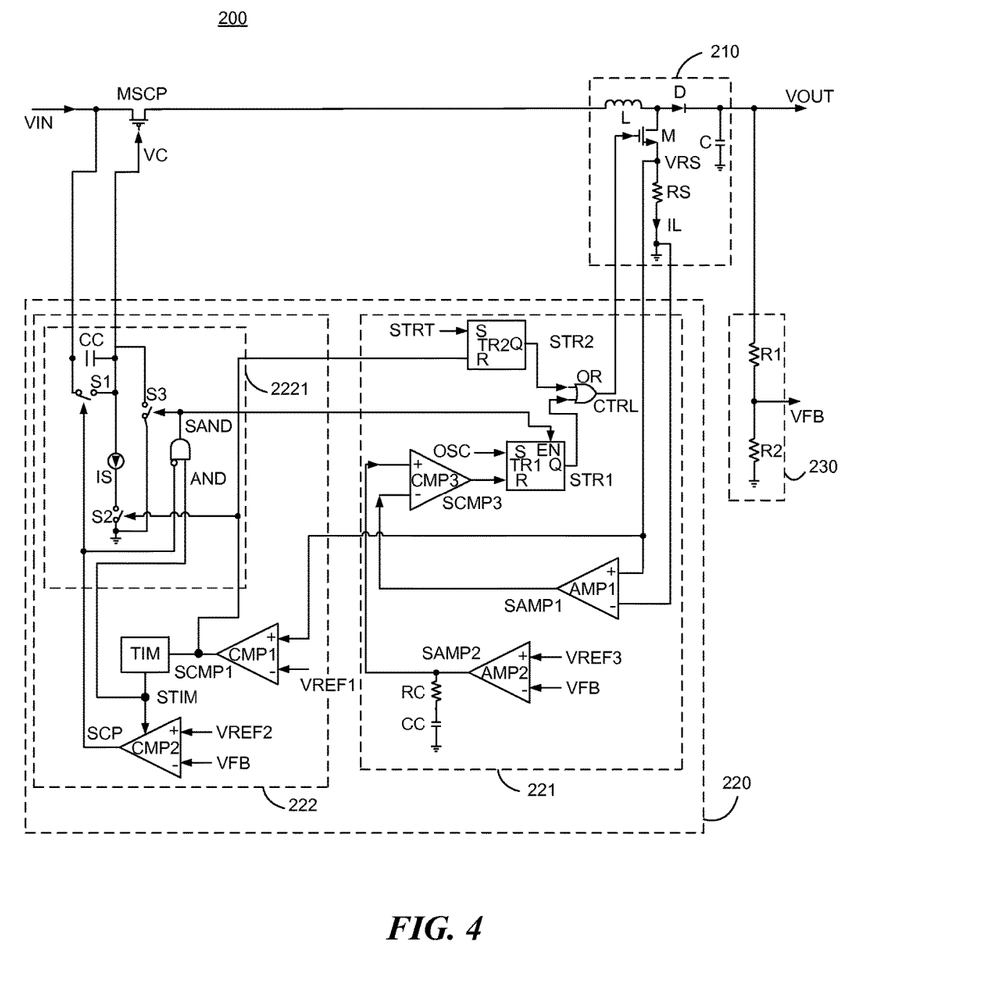
FIG. 4 schematically illustrates a boost converter 200 in accordance with another embodiment of the present invention.

FIG. 4 schematically illustrates a boost converter 200 in accordance with another embodiment of the present invention. As shown in FIG. 4, the boost converter 200 comprises a short-circuit protection switch MSCP, a switching circuit 210, a current detecting resistor RS, a controller 220 and a feedback circuit 230.

The switching circuit 210 has a similar configuration as that of the switching circuit 110 of FIG. 2, and the same parts of the configuration will not be described herein for clarity purpose and only the different parts will be addressed. As shown in FIG. 4, in the switching circuit 210, the second terminal of the switch M is electrically coupled to one terminal of the current detecting resistor RS and is configured to provide a current detecting voltage VRS. The other terminal of the current detecting resistor RS is electrically coupled to the reference ground. In one embodiment, the current detecting resistor RS may be replaced by the on-resistance of the switch M. In this embodiment, the second terminal of the switch M is coupled to the reference ground, a non-inverting input terminal of a current error amplifier AMP1 (will be soon described below) is electrically coupled to the first terminal of the switch M, and an inverting input terminal of the current error amplifier AMP1 is electrically coupled to the reference ground.

The feedback circuit 230 is electrically coupled to the output capacitor C to receive the output voltage VOUT and is configured to generate a feedback signal VFB based on the output voltage VOUT. In one embodiment, the feedback circuit comprises a voltage divider consisting of series-connected resistors R1 and R2.

The controller 220 comprises a switching control circuit 221 and a short-circuit protection control circuit 222. In the embodiment shown in FIG. 4, the switching control circuit 221 is implemented with peak current mode control technique. As shown in FIG. 4, the switching control circuit 221 comprises a current error amplifier AMP1, a voltage error amplifier AMP2, a PWM comparator CMP3 and a first flip-flop TR1. The current error amplifier AMP1 has a non-inverting input terminal, an inverting input terminal and an output terminal, wherein the non-inverting input terminal is electrically coupled to the first terminal of the current detecting resistor RS, and the inverting input terminal is electrically coupled the reference ground. The current error amplifier AMP1 amplifies the current detecting voltage VRS across the current detecting resistor RS and generates a current amplifying signal SAMP1 at the output terminal.

The voltage error amplifier AMP2 has a non-inverting input terminal, an inverting input terminal and an output terminal, wherein the non-inverting input terminal is configured to receive a reference voltage VREF3, and the inverting input terminal is electrically coupled to the feedback circuit 230 to receive the feedback signal VFB. The voltage error amplifier AMP2 amplifies the difference between the reference voltage VREF3 and the feedback signal VFB and generates a voltage amplifying signal SAMP2 at the output terminal. In the embodiment illustrated in FIG. 4, the voltage amplifying signal SAMP2 is further provided to the PWM comparator CMP3 after being compensated by a compensation circuit consisting of a resistor RC and a capacitor CC. In another embodiment, the voltage amplifying signal SAMP2 may be provided to the PWM comparator CMP3 without compensation. The PWM comparator CMP3 has a non-inverting input terminal, an inverting input terminal and an output terminal, wherein the non-inverting input terminal is electrically coupled to the output terminal of the current error amplifier AMP1 to receive the current amplifying signal SAMP1, and the inverting input terminal is electrically coupled to the output terminal of the voltage error amplifier AMP2 to receive the voltage amplifying signal SAMP2. The PWM comparator CMP3 compares the current amplifying signal SAMP1 with the voltage amplifying signal SAMP2 and generates a PWM signal SCMP3 at the output terminal. The first flip-flop TR1 has a set terminal S, a reset terminal R, an output terminal Q and an enable terminal EN, wherein the set terminal S is configured to receive a clock signal OSC, the reset terminal R is electrically coupled to the output terminal of the PWM comparator CMP3 to receive the PWM signal SCMP3. The first flip-flop TR1 is configured to generate a first flip-flop signal STR1 at the output terminal Q based on the clock signal OSC, the PWM signal SCMP3 and the signal received at the enable terminal EN. The output terminal Q of the first flip-flop TR1 is electrically coupled to the control terminal of the switch M to control the switching actions thereof.

The short-circuit protection switch MSCP and the short-circuit protection control circuit 222 forms a short-circuit protection circuit together. The short-circuit protection switch MSCP is implemented with a P-type MOSFET and has a first terminal, a second terminal and a control terminal. The first terminal is configured to receive the input voltage VIN, and the second terminal is electrically coupled to the first terminal of the inductor L. The short-circuit protection control circuit 222 comprises a current detecting circuit, a timing circuit TIM, a short-circuit detecting circuit and a voltage generating circuit 2221. The current detecting circuit comprises a current detecting comparator CMP1 having a non-inverting input terminal, an inverting input terminal and an output terminal. The non-inverting input terminal is electrically coupled to the first terminal of the current detecting resistor RS to receive the current detecting voltage VRS, the inverting input terminal is configured to receive a reference voltage VREF1. The current detecting comparator CMP1 compares the current detecting voltage VRS with the reference voltage VREF1 and generates a current detecting signal SCMP1. The timing circuit TIM is electrically coupled to the output terminal of the current detecting comparator CMP1 to receive the current detecting signal SCMP1 and generates a timing signal STIM based thereupon. The short-circuit detecting circuit comprises a short-circuit detecting comparator CMP2 having a non-inverting input terminal, an inverting input terminal, an enable terminal and an output terminal. The non-inverting input terminal is configured to receive a reference voltage VREF2, the inverting input terminal is electrically coupled to the feedback circuit 230 to receive the feedback signal VFB, and the enable terminal is electrically coupled to the timing circuit TIM to receive the timing signal STIM. The short-circuit detecting comparator CMP2 compares the feedback signal VFB with the reference voltage VREF2 and generates a short-circuit detecting signal SCP at the output terminal.

The voltage generating circuit 2221 comprises a capacitor CC, a current source IS, a first switch S1 and a second switch S2. The capacitor CC has a first terminal and a second terminal, wherein the first terminal is configured to receive the input voltage VIN, and the second terminal is electrically coupled to the control terminal of the short-circuit protection switch MSCP, so as to provide a control voltage VC (which is the difference between the voltage at the control terminal and the voltage at the first terminal of the switch MSCP) to the short-circuit protection switch MSCP. The first switch S1 has a first terminal, a second terminal and a control terminal, wherein the first terminal is electrically coupled to the first terminal of the capacitor CC, the second terminal is electrically coupled to the second terminal of the capacitor CC, and the control terminal is electrically coupled to the output terminal of the short-circuit detecting comparator CMP2 to receive the short-circuit detecting signal SCP. The current source IS has a first terminal and a second terminal, wherein the first terminal is electrically coupled to the second terminal of the first switch S1. The current source provides a current flowing from the first terminal to the second terminal. The second switch S2 has a first terminal, a second terminal and a control terminal, wherein the first terminal is electrically coupled to the second terminal of the current source IS, the second terminal is coupled to the reference ground, and the control terminal is electrically coupled to the output terminal of the current comparator CMP1 to receive the current detecting signal SCMP1. In the embodiment of FIG. 4, the voltage generating circuit 2221 further comprises a third switch S3 having a first terminal, a second terminal and a control terminal. The first terminal is electrically coupled to the second terminal of the capacitor CC, and the second terminal is coupled to the reference ground.

In the embodiment of FIG. 4, the switching control circuit 221 further comprises a second flip-flop TR2 and an OR gate, and the voltage generating circuit 2221 further comprises an AND gate. The second flip-flop TR2 has a set terminal S, a reset terminal R and an output terminal Q, wherein the set terminal S is configured to receive a start-up signal STRT, the reset terminal R is electrically coupled to the output terminal of the current detecting comparator CMP1 to receive the current detecting signal SCMP1. The second flip-flop TR2 generates a second flip-flop signal STR2 at the output terminal based on the start-up signal STRT and the current detecting signal SCMP1. The OR gate has a first input terminal, a second input terminal and an output terminal, wherein the first input terminal is electrically coupled to the first flip-flop TR1 to receive the first flip-flop signal STR1, and the second input terminal is electrically coupled to the second flip-flop TR2 to receive the second flip-flop signal STR2. Based on the first flip-flop signal STR1 and the second flip-flop signal STR2, the OR gate generates a switching control signal CTRL at the output terminal to control the switching actions of the switch M. The AND gate has a first input terminal, a second input terminal and an output terminal, wherein the first input terminal is electrically coupled to the output terminal of the timing circuit TIM to receive the timing signal STIM, and the second input terminal is electrically coupled to the output terminal of the short-circuit detecting comparator CMP2 to receive the complementary signal of the short-circuit detecting signal SCP. Based on the timing signal STIM and the short-circuit detecting signal SCP, the AND gate provides an AND signal SAND to the control terminal of the third switch S3 and the enable terminal EN of the first flip-flop TR1. In the embodiment of FIG. 4, the first flip-flop TR1, the second flip-flop TR2, the AND gate and the OR gate are illustrative, and may be replaced by other logic circuits in other embodiments.

Initially, when the boost converter 200 starts up, the start-up signal STRT is provided to the set terminal S of the second flip-flop TR2 which, in turn, provides a high level second flip-flop signal STR2 to the second input terminal of the OR gate. Then, the OR gate outputs a high level switching control signal CTRL to turn on the switch M. When the boost converter 200 starts up, the short-circuit detecting comparator CMP2 is disabled, a low level short-circuit detecting signal SCP is thus generated to turn off the first switch S1. Additionally, as the current detecting voltage VRS is lower than the first reference signal VREF1 when the boost converter 200 starts up, the current detecting comparator CMP1 outputs a low level current detecting signal SCMP1 to the control terminal of the second switch S2 so as to turn on the second switch S2. Furthermore, as the timing circuit TIM is not activated when the boost converter 200 starts up, the timing circuit TIM outputs a low level timing signal STIM to the first input terminal of the AND gate which, in turn, outputs a low level AND signal SAND to turn off the third switch S3. As a result, the current source IS pulls down the control voltage VC supplied to the short-circuit protection switch MSCP, the magnitude of the control voltage VC thus increases gradually.

When the boost converter 200 starts up, the magnitude of the control voltage VC is too small to turn on the short-circuit protection switch MSCP. No current thus substantially flows through the switch M. As the magnitude of the control voltage VC increases gradually, the short-circuit protection switch MSCP is turned on when the control voltage VC reaches the threshold voltage of the short-circuit protection switch MSCP, resulting in a current IL flowing through the switch M. Further, the voltage VRS across the current detecting resistor RS increases gradually with the gradually increasing current IL. When the current detecting voltage VRS reaches the reference voltage VREF1, the current detecting comparator CMP1 outputs a high level current detecting signal SCMP1 to turn off the second switch S2 and the current source IS thus stops pulling down the control voltage VC.

Additionally, the high level current detecting signal SCMP1 resets the second flip-flop TR2 which, in turn, provides a low level second flip-flop signal STR2 at the output terminal. Furthermore, as the first flip-flop TR1 is disabled, the first flip-flop signal STR1 is low level. Thus, the OR gate outputs a low level switching control signal CTRL to turn off the switch M. The current IL correspondingly flows through the diode D, and a gradually increasing output voltage VOUT is provided by the output capacitor C. Furthermore, the timing circuit TIM starts timing when it is triggered by the current detecting signal SCMP1.

After a preset time period, the timing circuit TIM generates a high level timing signal STIM to enable the short-circuit detecting comparator CMP2 which thus starts to compare the reference voltage VREF2 with the feedback signal VFB. If the boost converter 200 is not shorted to the reference ground, the feedback signal VFB will be higher than the reference voltage VREF2 and the short-circuit detecting comparator CMP2 will thus generate a low level short-circuit detecting signal SCP at the output terminal. The AND gate will thus output a high level AND signal SAND to turn on the third switch S3 and the short-circuit protection switch MSCP will be fully turned on. In this way, the loss will be reduced. Further, the high level AND signal SAND will enable the first flip-flop TR1, and the boost converter 200 will thus start to operate normally. In opposite, if the boost converter 200 is shorted to the reference ground, the feedback signal VFB will be lower than the reference voltage VREF2 and the short-circuit detecting comparator CMP2 will thus generate a high level short-circuit detecting signal SCP. The high level short-circuit detecting signal SCP will turn on the first switch S1, the control voltage VC supplied to the short-circuit protection switch MSCP will thus become to zero volts. Thus, the short-circuit protection switch MSCP will be turned off to protect the boost converter 200 from damage.

When the boost converter 200 operates normally, the first flip-flop TR1 switches the switch M on and off alternately based on the clock signal OSC and the PWM signal SCMP3. At the rising edge of the clock signal OSC, the first flip-flop TR1 generates a high level first flip-flop signal STR1. Thus, the OR gate outputs a high level switching control signal CTRL to turn on the switch M so as to charge the inductor L. The current flowing through the inductor L increases gradually, and when it increases to an extent that the current amplifying signal SAMP1 is higher than the voltage amplifying signal SAMP2, the PWM comparator CMP3 generates a high level PWM signal SCMP3 to reset the first flip-flop TR1 which, in turn, generates a low level first flip-flop signal STR1. The OR gate thus outputs a low level switching control signal CTRL to turn off the switch M. The current flows through the diode D until the next rising edge of the clock signal OSC. The above operation subsequently repeats again and again. By this design, the input voltage VIN is converted into the output voltage VOUT by the boost converter 200.

Figure 5:
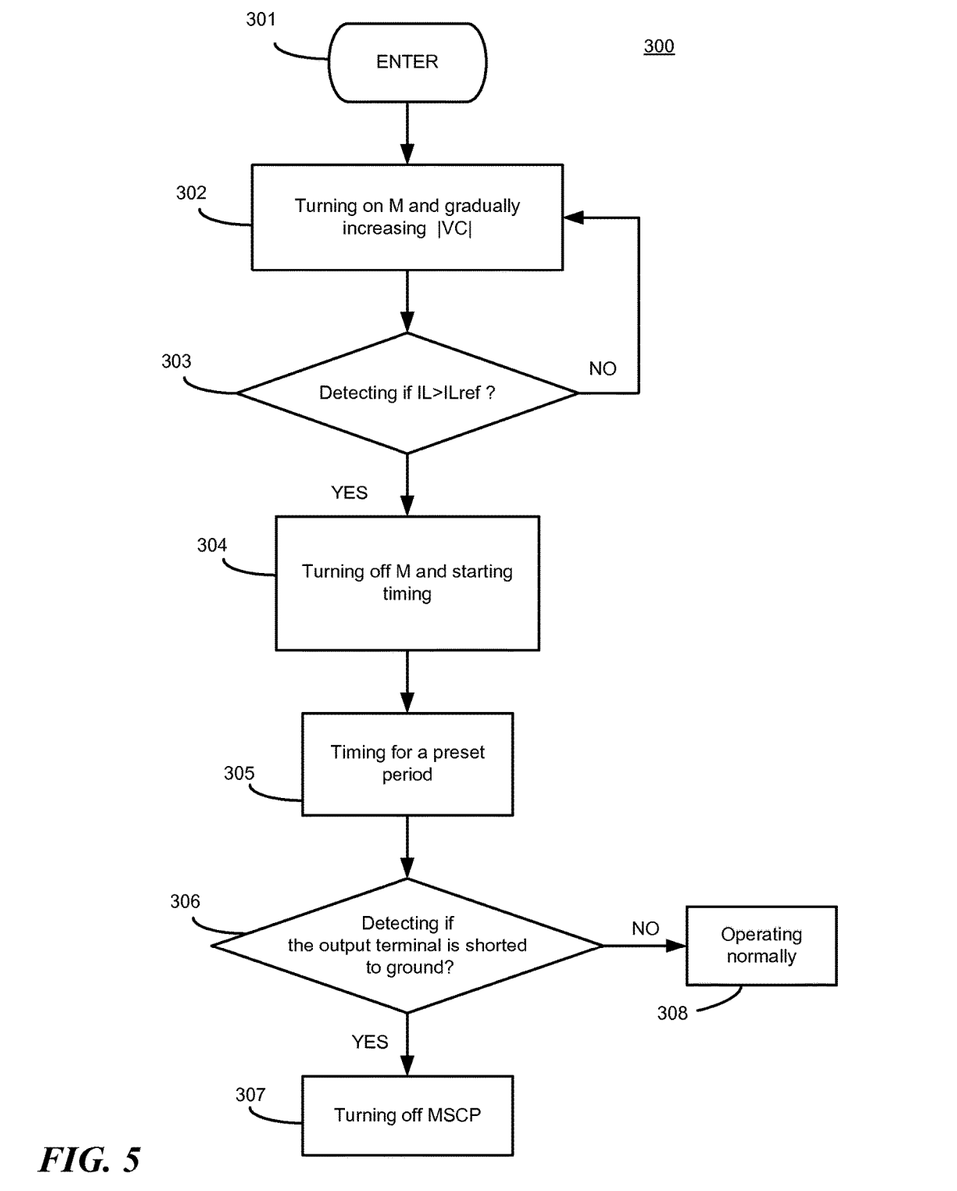
FIG. 5 illustrates a flow chart of a short-circuit protection method 300 for a boost converter in accordance with an embodiment of the present invention.

FIG. 5 illustrates a flow chart of a short-circuit protection method 300 for a boost converter in accordance with an embodiment of the present invention. The boost converter comprises a switching circuit and a short-circuit protection switch MSCP. The short-circuit protection switch MSCP has a first terminal, a second terminal and a control terminal, wherein the first terminal is configured to receive an input voltage. The switching circuit comprises an inductor, a switch M, a freewheeling element and an output capacitor. The inductor has a first terminal and a second terminal, wherein the first terminal is electrically coupled to the second terminal of the short-circuit protection switch MSCP. The switch M has a first terminal, a second terminal and a control terminal, wherein the first terminal is electrically coupled to the second terminal of the inductor, and the second terminal is coupled to a reference ground. The freewheeling element has a first terminal and a second terminal, wherein the first terminal is electrically coupled to the second terminal of the inductor. The output capacitor has a first terminal and a second terminal, wherein the first terminal is electrically coupled to the second terminal of the freewheeling element, and the second terminal is coupled to the reference ground. As shown in FIG. 5, the short-circuit protection method 300 comprises steps 301-308. The boost converter starts up in step 301. In step 302, the switch M is turned on and a control voltage VC with a gradually increasing magnitude |VC| is supplied to the short-circuit protection switch MSCP. In one embodiment, the short-circuit protection switch MSCP may be implemented with any controllable switching semiconductor devices, such as MOSFET, IGBT or the like. In another embodiment, the short-circuit protection switch MSCP may be P-type or N type transistors. The control voltage VC is of negative value when the short-circuit protection switch MSCP is a P-type transistor and is of positive value when the short-circuit protection switch MSCP is an N-type transistor.

In step 303, a current IL flowing through the switch M is detected and further compared with a predetermined value ILref. If the current IL is higher than the predetermined value ILref, the short-circuit protection method 300 proceeds to step 304 to turn off the switch M and to initiate a time period. In one embodiment, step 304 further comprises maintaining the control voltage VC. Otherwise, the short-circuit protection method 300 steps back to step 302 to keep the switch M on and to continue to increase the magnitude |VC| of the control voltage VC. The short-circuit protection method 300 proceeds to step 306 to detect whether the output terminal of the boost converter is shorted to the reference ground after timing for a preset period in step 305. In one embodiment, step 306 comprises detecting a feedback signal representative of an output voltage of the boost converter and further comparing the feedback signal with a reference voltage. In such embodiment, the output short-circuit event occurs in the boost converter when the feedback signal is lower than the reference voltage. Otherwise, no output short-circuit event occurs and step 308 where the boost converter operates normally is performed. In opposite, the short-circuit protection method 300 goes to step 307 to turn off the short-circuit protection switch MSCP.

It will be appreciated by persons skilled in the art that the present invention is not limited to what has been particularly shown and described herein above. Rather the scope of the present invention is defined by the appended claims and includes both combinations and sub-combinations of the various features described hereinabove as well as variations and modifications thereof which would occur to persons skilled in the art upon reading the foregoing description and which are not in the prior art.

We claim:

1. A short-circuit protection method for a boost converter comprising a short-circuit protection switch and a switching circuit, wherein the short-circuit protection switch is coupled between an input voltage and the switching circuit, and wherein the switching circuit has a switch and is configured to provide an output voltage at an output terminal based on the input voltage, the short-circuit protection method comprises:
   turning on the switch and supplying a control voltage to gradually turn on the short-circuit protection switch when the boost converter starts up;
   detecting whether a current flowing through the switch is higher than a predetermined value;
   turning off the switch and starting timing when the current flowing through the switch is higher than the predetermined value;
   detecting whether the output terminal of the boost converter is shorted to a reference ground after a preset time period; and
   turning off the short-circuit protection switch when the output terminal of the boost converter is shorted to the reference ground.

2. The short-circuit protection method of claim 1, wherein the step of detecting whether the output terminal of the boost converter is shorted to the reference ground comprises detecting whether a feedback signal representative of the output voltage is lower than a reference voltage.

3. The short-circuit protection method of claim 1, wherein the short-circuit protection method further comprises maintaining the control voltage during the preset time period.

4. The short-circuit protection method of claim 1, wherein the short-circuit protection switch comprises a P-type MOSFET.

5. A controller for a boost converter comprising a short-circuit protection switch and a switching circuit, wherein the short-circuit protection switch has a first terminal configured to receive an input voltage, a second terminal and a control terminal, and wherein the switching circuit is coupled to the second terminal of the short-circuit protection switch and is configured to convert the input voltage into an output voltage at an output terminal, and the switching circuit comprises a switch, the controller comprises:
   a short-circuit protection control circuit, comprising:
      a current detecting circuit configured to detect whether a current flowing through the switch reaches a predetermined value and to generate a current detecting signal based on the detection;
      a timing circuit coupled to the current detecting circuit and configured to generate a timing signal based on the current detecting signal;
      a short-circuit detecting circuit coupled to the timing circuit and configured to detect whether the output terminal of the switching circuit is shorted to a reference ground and to thereby generate a short-circuit detecting signal based on the timing signal; and
      a voltage generating circuit coupled to the current detecting circuit and the short-circuit detecting circuit and configured to generate a control voltage to control the short-circuit protection switch based on the current detecting signal and the short-circuit detecting signal; and
   a switching control circuit coupled to the current detecting circuit and the switching circuit and configured to generate a switching control signal to control the switch based on the current detecting signal and a feedback signal representative of the output voltage.

6. The controller of claim 5, wherein
   the boost converter comprises a current detecting resistor having a first terminal and a second terminal, wherein the first terminal is coupled to the switch, and the second terminal is coupled to the reference ground; and
   the current detecting circuit comprises a current detecting comparator having a first input terminal, a second input terminal and an output terminal, wherein the first input terminal is coupled to the first terminal of the current detecting resistor, the second input terminal is configured to receive a first reference voltage, the current detecting comparator compares the voltage across the current detecting resistor with the first reference voltage and generates the current detecting signal at the output terminal based on the comparison result.

7. The controller of claim 5, wherein the short-circuit detecting circuit comprises a short-circuit detecting comparator having a first input terminal, a second input terminal, an enable terminal and an output terminal, wherein the first input terminal is coupled to the switching circuit, the second input terminal is configured to receive a second reference voltage, the enable terminal is coupled to the timing circuit, the short-circuit detecting comparator compares the feedback signal with the second reference voltage based on the timing signal and generates the short-circuit detecting signal at the output terminal based on the comparison result.

8. The controller of claim 5, wherein the voltage generating circuit comprises:
   a capacitor having a first terminal and a second terminal, wherein the first terminal is configured to receive the input voltage, and the second terminal is coupled to the control terminal of the short-circuit protection switch;
   a first switch having a first terminal, a second terminal and a control terminal, wherein the first terminal is coupled to the first terminal of the capacitor, the second terminal is coupled to the second terminal of the capacitor, and the control terminal is coupled to the short-circuit detecting circuit to receive the short-circuit detecting signal;
   a current source having a first terminal and a second terminal, wherein the first terminal is coupled to the second terminal of the capacitor; and
   a second switch having a first terminal, a second terminal and a control terminal, wherein the first terminal is coupled to the second terminal of the current source, the second terminal is coupled to the reference ground, and the control terminal is coupled to the current detecting circuit to receive the current detecting signal.

9. The controller of claim 8, wherein the voltage generating circuit further comprises a third switch having a first terminal, a second terminal and a control terminal, wherein the first terminal is coupled to the second terminal of the capacitor, the second terminal is coupled to the reference ground, and the control terminal is controlled by the timing signal and the short-circuit detecting signal.

10. The controller of claim 5, wherein
the boost converter comprises a current detecting resistor having a first terminal and a second terminal, wherein the first terminal is coupled the switch and is configured to provide a current detecting voltage, and the second terminal is coupled to the reference ground;
the switching control circuit comprises:
a current error amplifier having a first input terminal, a second input terminal and an output terminal, wherein the first input terminal is coupled to the first terminal of the current detecting resistor, the second input terminal is coupled to the second terminal of the current detecting resistor, the current error amplifier amplifies the current detecting voltage and generates a current amplifying signal;
a voltage error amplifier having a first input terminal, a second input terminal and an output terminal, wherein the first input terminal is configured to receive a third reference voltage, the second input terminal is configured to receive the feedback signal, the voltage error amplifier amplifies the difference between the third reference voltage and the feedback signal and generates a voltage amplifying signal at the output terminal;
a pulse-width-modulation comparator having a first input terminal, a second input terminal and an output terminal, wherein the first input terminal is coupled to the output terminal of the voltage error amplifier, the second input terminal is coupled to the output terminal of the current error amplifier, the pulse-width-modulation comparator compares the current amplifying signal with the voltage amplifying signal and generates a pulse-width-modulation signal at the output terminal; and
a first flip-flop having a set terminal, a reset terminal and an output terminal, wherein the set terminal is configured to receive a clock signal, and the reset terminal is coupled to the output terminal of the pulse-width-modulation comparator, the first flip-flop is configured to provide a first flip-flop signal at the output terminal to control the switching actions of the switch.

11. The controller of claim 10, wherein
the voltage generating circuit further comprises an AND gate having a first input terminal, a second input terminal and an output terminal, wherein the first input terminal is coupled to the timing circuit, and the second input terminal is coupled to the short-circuit detecting circuit to receive a complementary signal of the short-circuit detecting signal, the AND gate provides an AND signal to an enable terminal of the first flip-flop; and
the switching control circuit further comprises a second flip-flop having a set terminal, a reset terminal and an output terminal, wherein the set terminal is configured to receive a start-up signal, the reset terminal is coupled to the output terminal of the current detecting comparator, the second flip-flop generates a second flip-flop signal at the output terminal based on the start-up signal and the current detecting signal; and an OR gate having a first input terminal, a second input terminal and an output terminal, wherein the first input terminal is coupled the output terminal of the first flip-flop, the second input terminal is coupled to the output terminal of the second flip-flop, the OR gate generates the switching control signal at the output terminal based on the first flip-flop signal and the second flip-flop signal.

12. The controller of claim 5, wherein the short-circuit protection switch comprises a P-type MOSFET.

13. A boost converter, comprising:
a short-circuit protection switch having a first terminal, a second terminal and a control terminal, wherein the first terminal is configured to receive an input voltage;
a switching circuit comprising an inductor, a switch, a freewheeling element and a capacitor, wherein the inductor has a first terminal coupled to the second terminal of the short-circuit protection switch and a second terminal, the switch has a first terminal coupled to the second terminal of the inductor, a second terminal and a control terminal, wherein the second terminal is coupled to a reference ground, the freewheeling element has a first terminal coupled to the second terminal of the inductor and a second terminal, and the capacitor has a first terminal coupled to the second terminal of the freewheeling element and a second terminal coupled to the reference ground, and wherein the capacitor is configured to provide an output voltage at the first terminal;
a controller having a first terminal, a second terminal and a third terminal, wherein the first terminal is configured to receive a feedback signal representative of the output voltage, the second terminal is coupled to the control terminal of the short-circuit protection switch to control the short-circuit protection switch, and the third terminal is coupled to the control terminal of the switch to control the switch; and
wherein the switch is turned on and the short-circuit protection switch is gradually turned on when the boost converter starts up; the switch is turned off and a preset time period is initiated when a current flowing through the switch is higher than a predetermined value; whether an output short-circuit event occurs is detected after the preset time period; and the short-circuit protection switch is turned off when the boost converter is shorted to the reference ground.

14. The boost converter of claim 13, wherein the controller comprises:
a short-circuit protection control circuit, comprising:
a current detecting circuit configured to detect whether the current flowing through the switch reaches the predetermined value and to generate a current detecting signal based on the detection;
a timing circuit coupled to the current detecting circuit and configured to generate a timing signal based on the current detecting signal;
a short-circuit detecting circuit coupled to the timing circuit and configured to generate a short-circuit detecting signal based on the timing signal; and
a voltage generating circuit coupled to the current detecting circuit and the short-circuit detecting circuit and configured to generate a control voltage to control the short-circuit protection switch based on the current detecting signal and the short-circuit detecting signal; and
a switching control circuit coupled to the current detecting circuit and the
switching circuit and configured to generate a switching control signal to control the switch based on the current detecting signal and the feedback signal.

15. The boost converter of claim 14, wherein the current detecting circuit comprises:

a current detecting resistor having a first terminal and a second terminal, wherein the first terminal is coupled to the switch, and the second terminal is coupled to the reference ground; and a current detecting comparator having a first input terminal, a second input terminal and an output terminal, wherein the first input terminal is coupled to the first terminal of the current detecting resistor, the second input terminal is configured to receive a first reference voltage, the current detecting comparator compares the voltage across the current detecting resistor with the first reference voltage and generates the current detecting signal at the output terminal based on the comparison result.

16. The boost converter of claim 14, wherein the short-circuit detecting circuit comprises a short-circuit detecting comparator having a first input terminal, a second input terminal, an enable terminal and an output terminal, wherein the first input terminal is coupled to the switching circuit, the second input terminal is configured to receive a second reference voltage, the enable terminal is coupled to the timing circuit, the short-circuit detecting comparator compares the feedback signal with the second reference voltage based on the timing signal and generates the short-circuit detecting signal at the output terminal based on the comparison result.

17. The boost converter of claim 14, wherein the voltage generating circuit comprises:
  a capacitor having a first terminal and a second terminal, wherein the first terminal is configured to receive the input voltage, and the second terminal is coupled to the control terminal of the short-circuit protection switch;
  a first switch having a first terminal, a second terminal and a control terminal, wherein the first terminal is coupled to the first terminal of the capacitor, the second terminal is coupled to the second terminal of the capacitor, and the control terminal is coupled to the short-circuit detecting circuit to receive the short-circuit detecting signal;
  a current source having a first terminal and a second terminal, wherein the first terminal is coupled to the second terminal of the capacitor; and
  a second switch having a first terminal, a second terminal and a control terminal, wherein the first terminal is coupled to the second terminal of the current source, the second terminal is coupled to a reference ground, and the control terminal is coupled to the current detecting circuit to receive the current detecting signal.

18. The boost converter of claim 17, wherein the voltage generating circuit further comprises a third switch having a first terminal, a second terminal and a control terminal, wherein the first terminal is coupled to the second terminal of the capacitor, the second terminal is coupled to the reference ground, and the control terminal is controlled by the timing signal and the short-circuit detecting signal.

19. The boost converter of claim 14, wherein the switching control circuit comprises:
  a current detecting resistor having a first terminal and a second terminal, wherein the first terminal is coupled the switch and is configured to provide a current detecting voltage, and the second terminal is coupled to a reference ground;
  a current error amplifier having a first input terminal, a second input terminal and an output terminal, wherein the first input terminal is coupled to the first terminal of the current detecting resistor, the second input terminal is coupled to the second terminal of the current detecting resistor, the current error amplifier amplifies the current detecting voltage and generates a current amplifying signal;
  a voltage error amplifier having a first input terminal, a second input terminal and an output terminal, wherein the first input terminal is configured to receive a third reference voltage, the second input terminal is configured to receive the feedback signal, the voltage error amplifier amplifies the difference between the third reference voltage and the feedback signal and generates a voltage amplifying signal at the output terminal;
  a pulse-width-modulation comparator having a first input terminal, a second input terminal and an output terminal, wherein the first input terminal is coupled to the output terminal of the voltage error amplifier, the second input terminal is coupled to the output terminal of the current error amplifier, the pulse-width-modulation comparator compares the current amplifying signal with the voltage amplifying signal and generates a pulse-width-modulation signal at the output terminal; and
  a first flip-flop having a set terminal, a reset terminal and an output terminal, wherein the set terminal is configured to receive a clock signal, the reset terminal is coupled to the output terminal of the pulse-width-modulation comparator, the first flip-flop is configured to provide a first flip-flop signal at the output terminal to control the switching actions of the switch.

20. The boost converter of claim 19, wherein
the voltage generating circuit further comprises an AND gate having a first input terminal, a second input terminal and an output terminal, wherein the first input terminal is coupled to the timing circuit, and the second input terminal is coupled to the short-circuit detecting circuit to receive a complementary signal of the short-circuit detecting signal, the AND gate provides an AND signal to an enable terminal of the first flip-flop; and
the switching control circuit further comprises a second flip-flop having a set terminal, a reset terminal and an output terminal, wherein the set terminal is configured to receive a start-up signal, the reset terminal is coupled to the output terminal of the current detecting comparator, the second flip-flop generates a second flip-flop signal at the output terminal based on the start-up signal and the current detecting signal; and an OR gate having a first input terminal, a second input terminal and an output terminal, wherein the first input terminal is coupled the output terminal of the first flip-flop, the second input terminal is coupled to the output terminal of the second flip-flop, the OR gate generates the switching control signal at the output terminal based on the first flip-flop signal and the second flip-flop signal.

* * * * *